Aug. 21, 1934.   W. HULLINGER   1,971,263
DISPLAY UNIT
Filed May 1, 1933   5 Sheets-Sheet 1
FIG. 1.
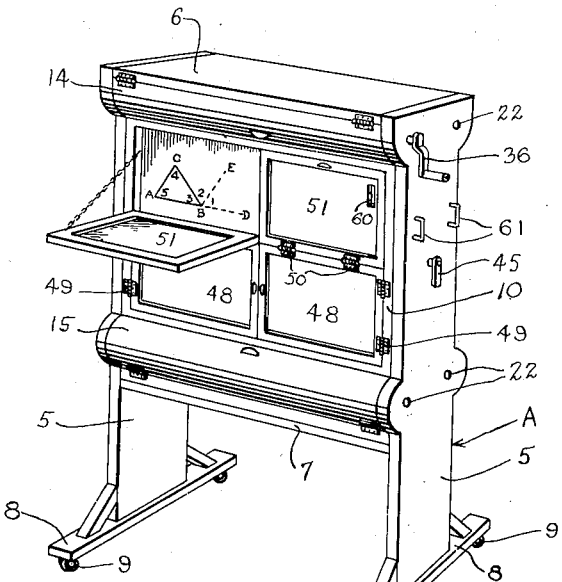
FIG. 2.
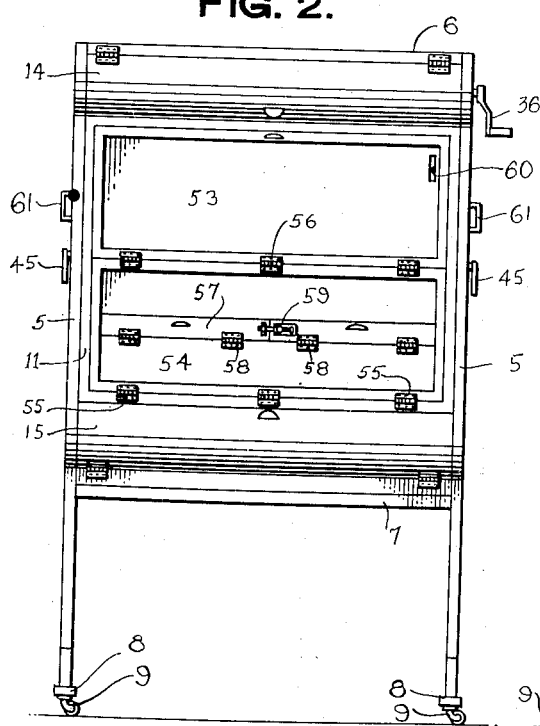
FIG. 4.   FIG. 5.
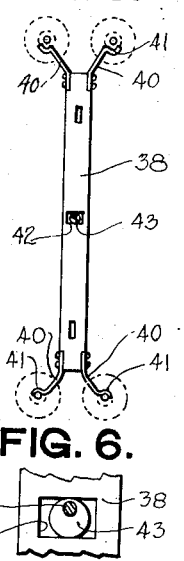
FIG. 6.
INVENTOR.
Will Hullinger
BY
Lancaster, Allwine & Rommel
ATTORNEYS.

Aug. 21, 1934.   W. HULLINGER   1,971,263
DISPLAY UNIT
Filed May 1, 1933   5 Sheets-Sheet 2
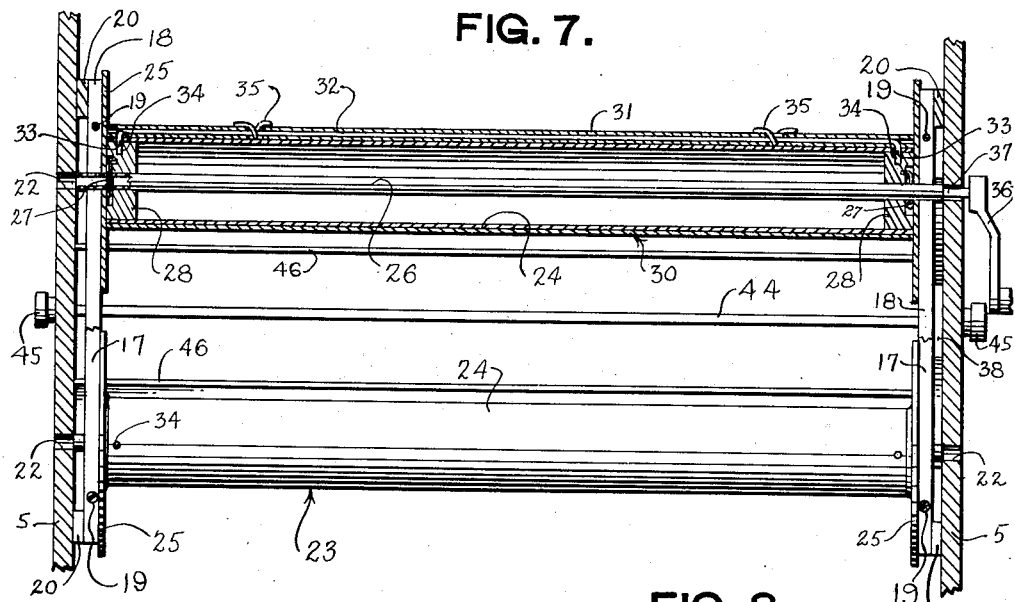
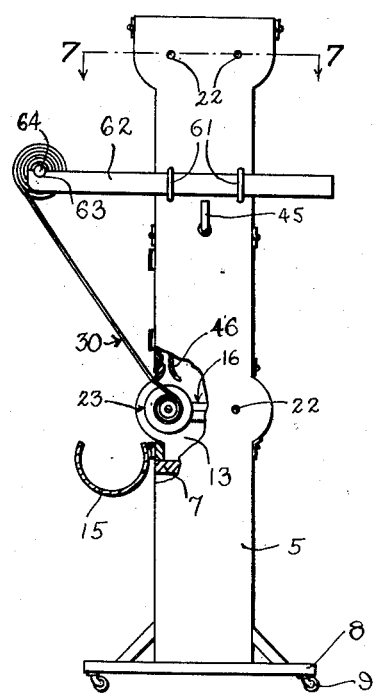
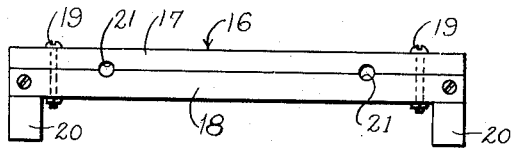
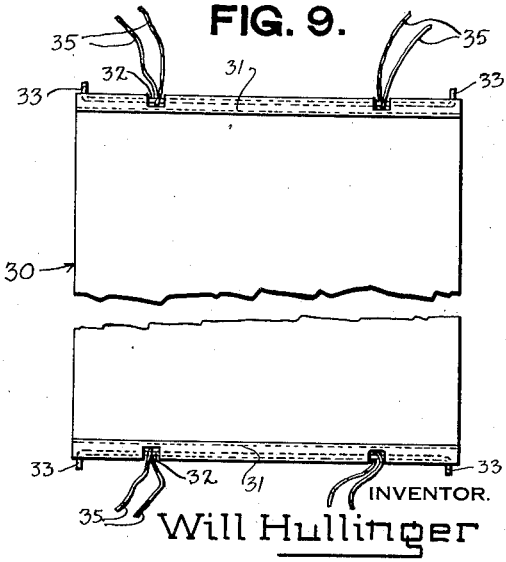
INVENTOR.
Will Hullinger
BY Lancaster, Allwine and Rommel
ATTORNEYS.

Aug. 21, 1934.　　　　W. HULLINGER　　　　1,971,263
DISPLAY UNIT
Filed May 1, 1933　　　　5 Sheets-Sheet 3

INVENTOR.
Will Hullinger
BY
Lancaster, Allwine and Rommel
ATTORNEYS.

Aug. 21, 1934.  W. HULLINGER  1,971,263
DISPLAY UNIT
Filed May 1, 1933  5 Sheets-Sheet 4
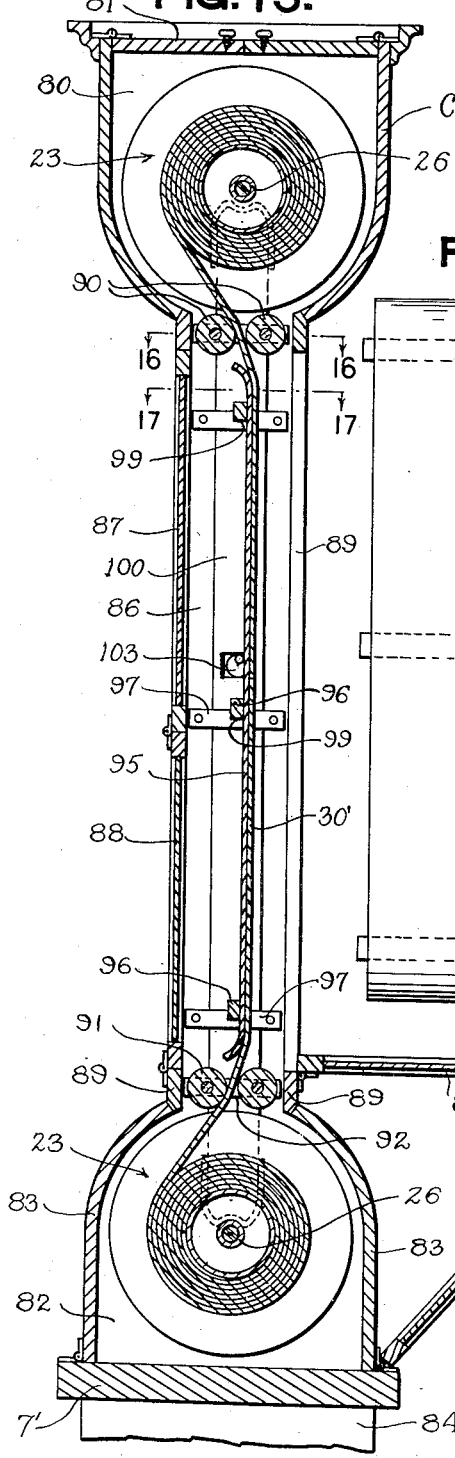
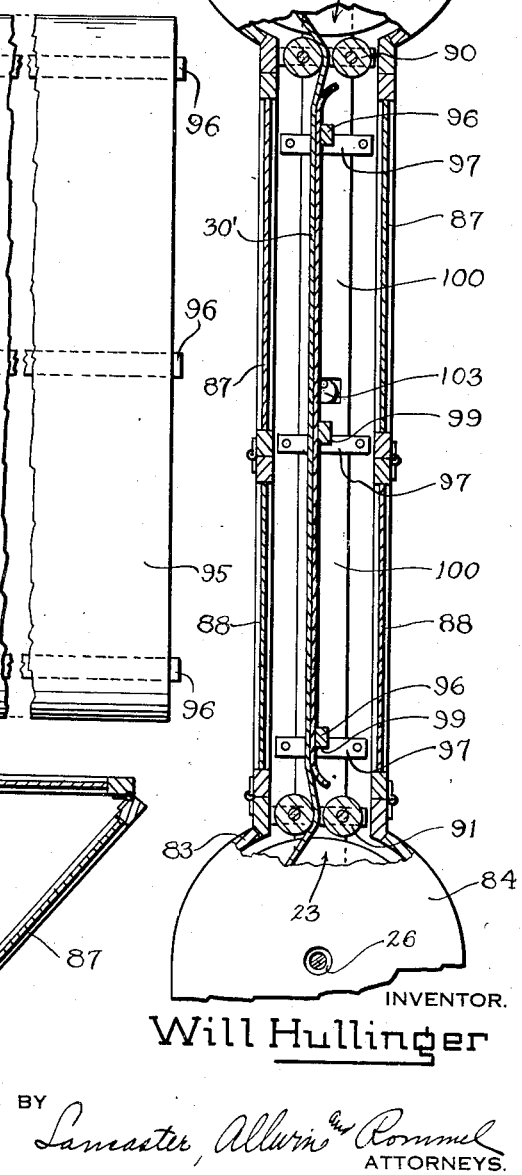
INVENTOR.
Will Hullinger
BY Lamaster, Allwin & Rommel
ATTORNEYS.

Aug. 21, 1934.  W. HULLINGER  1,971,263
DISPLAY UNIT
Filed May 1, 1933  5 Sheets-Sheet 5
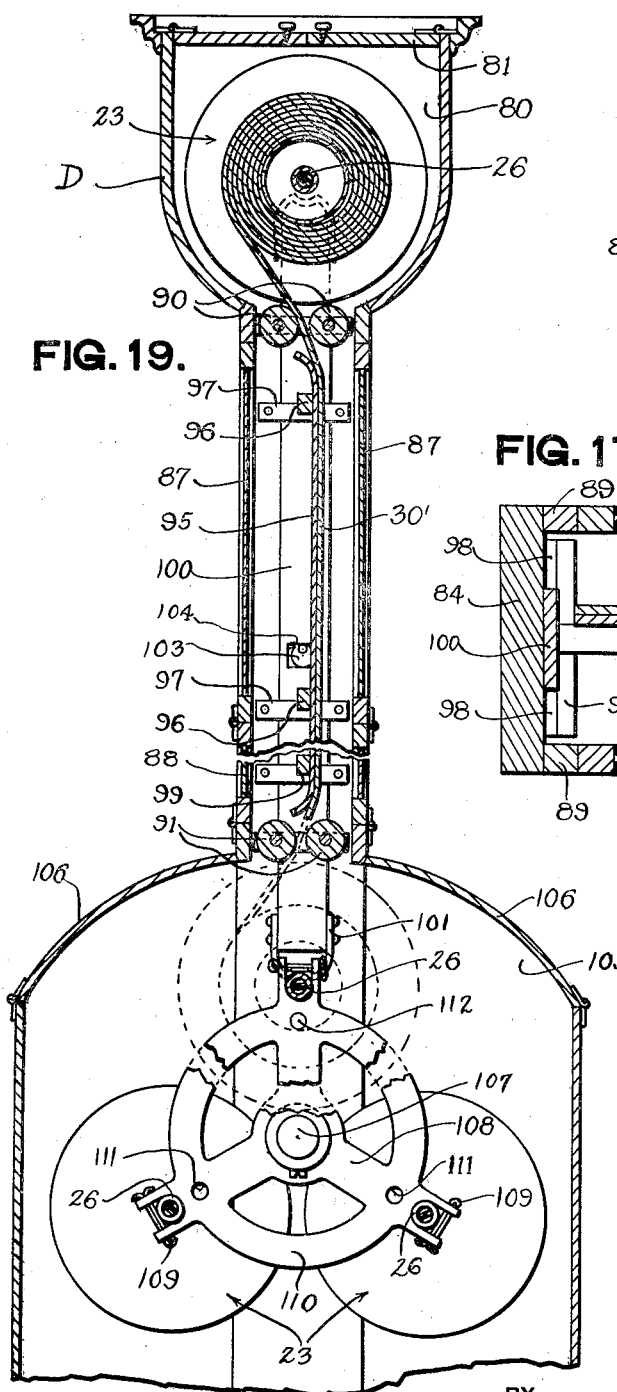
FIG. 19.
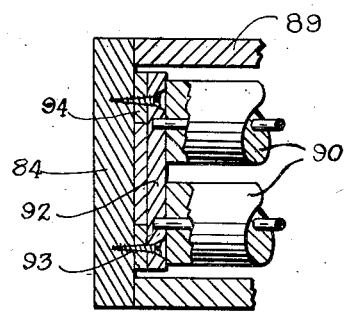
FIG. 16.
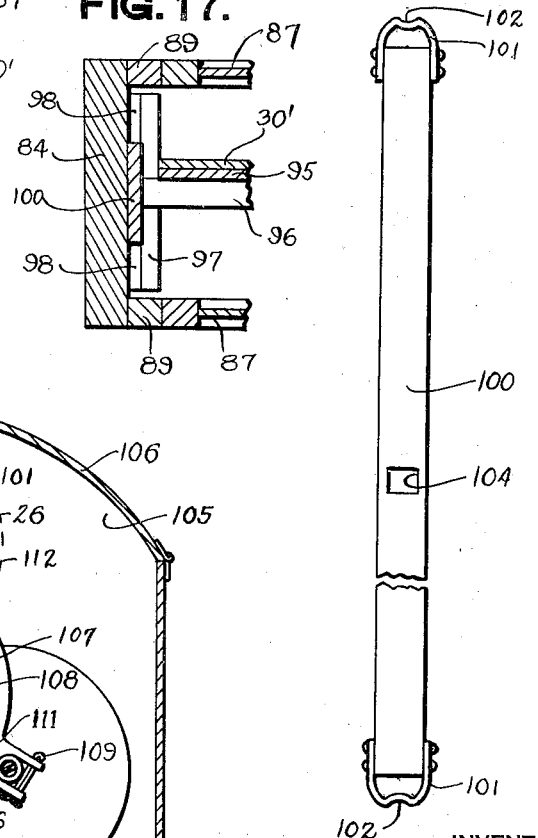
FIG. 17.
FIG. 18.
INVENTOR.
Will Hullinger
BY Lancaster, Allwine and Rommel
ATTORNEYS.

Patented Aug. 21, 1934

1,971,263

UNITED STATES PATENT OFFICE 1,971,263

DISPLAY UNIT

Will Hullinger, San Jose, Ill.

Application May 1, 1933, Serial No. 668,872

26 Claims. (Cl. 40—86)

The present invention relates to rotary display cabinets or units and more particularly to apparatus of this character primarily intended for use in classes of instruction, purposes of demonstration and lecturing on various subjects.

The primary object of the invention is to provide a portable display unit for use in displaying maps, charts, questions, flash cards, etc.

A further object of the invention is to provide a display unit wherein various phases of subject matter may be combined in a single display unit upon a belt or band, with display openings thru which any desired subject matter may be displayed.

A further object of the invention is to provide a rotary display unit having subdivided display openings for displaying either the whole or any desired portion of the subject matter.

A further object of the invention is to provide a display unit wherein the subject matter is provided upon a belt or band arranged for movement past a display opening with means for imparting movement to the band whereby the desired subject matter may be disposed at the display opening.

A further object resides in the novel arrangement for selectively providing a braking action upon the rollers and permitting proper movement of the band from one roller to the other.

A further object of the invention resides in the novel arrangement whereby a removable backing may be disposed at either face of a display band having display indicia at each face thereof.

A further object of the invention is to provide a display unit embodying a storage or magazine compartment in which a number of the rolls are mounted in a manner to be selectively brought into position for use.

A still further and important object of the invention is to provide apparatus of this character which will be neat in appearance and may be readily transferred from place to place for disposing the display indicia directly in front of the observer.

Other objects and advantages of the invention will be apparent from the following detailed description, taken in connection with the accompanying drawings, forming a part of this specification and in which drawings:—

Figure 1 is a perspective view of the preferred form of display unit or cabinet having two independently movable display bands for display at opposite sight openings and showing a section of one of the display doors open.

Figure 2 is a view in elevation of the unit looking at the opposite side from that shown in Figure 1.

Figure 3 is an end view showing the manner in which the band of material may be transferred to one of the lower rollers within the cabinet.

Figure 4 is a vertical sectional view thru the unit.

Figure 5 is a detail view of the friction brake device for selectively applying a braking action to the upper and lower rollers.

Figure 6 is an enlarged fragmentary detail showing the cam arrangement for shifting the brake device.

Figure 7 is an enlarged detail sectional view substantially on the line 7—7 of Figure 3 and showing one of the rollers in section.

Figure 8 is an elevation of one of the mounting blocks for the rollers.

Figure 9 is a plan view of one of the display or material bands with the intermediate portion broken away.

Figure 13 is a fragmentary vertical sectional view thru a further modified form of the invention embodying an arrangement whereby a single display band having display indicia at both sides thereof may be displayed at either side of the cabinet.

Figure 14 is a view part in section and part in end elevation of the unit shown in Figure 13 and showing the backing panel disposed at the opposite side of the display band from that shown in Figure 13.

Figure 15 is a plan view of the face side of the removable backing panel with the intermediate portion broken away.

Figures 16 and 17 are enlarged fragmentary sections on the respective lines in Figure 13.

Figure 18 is a view of the friction brake device for the unit shown in Figure 13.

Figure 19 is a fragmentary vertical sectional view thru a further modification of the invention showing a roller magazine for the form of display unit shown in Figure 13.

Figure 10:
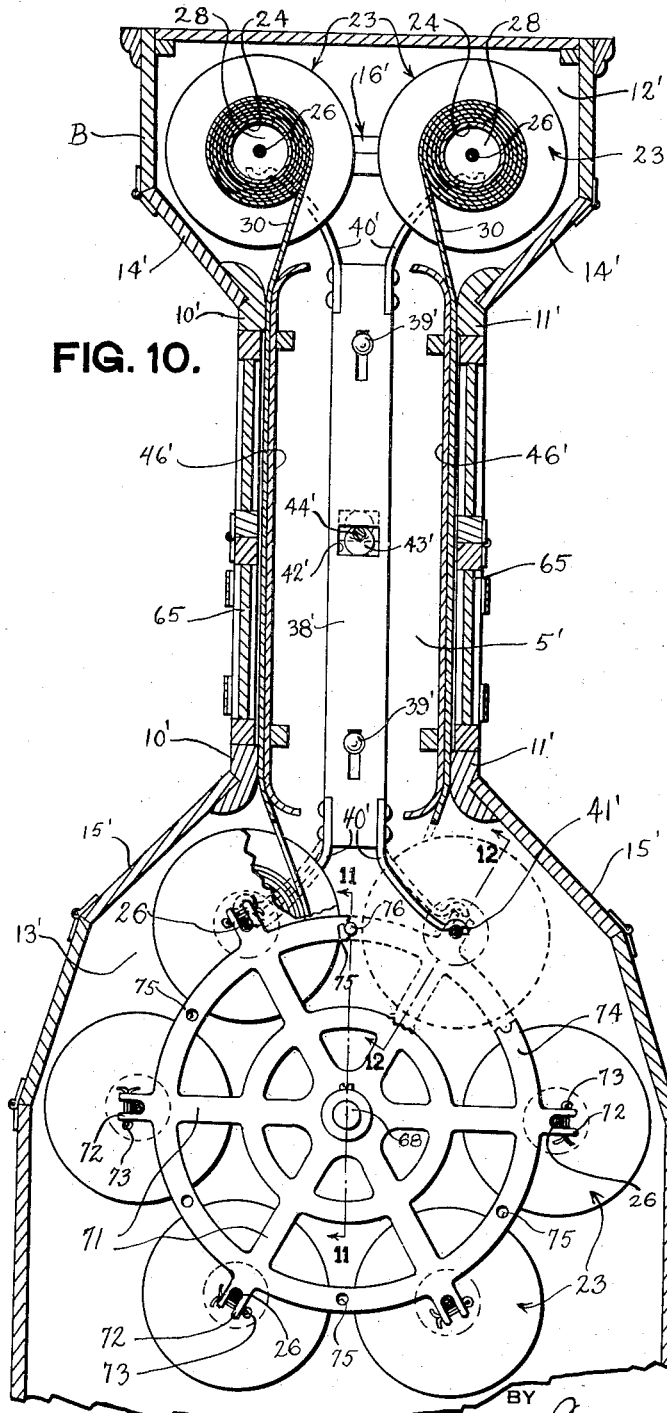
Figure 10 is an enlarged vertical sectional view thru a modified form of display unit having means for mounting a plurality of rollers in a manner to be selectively brought into position for use.

In the drawings, wherein similar reference characters designate corresponding parts throughout the several views, and referring particularly to the form of invention disclosed in Figures 1 to 9 inclusive, the display unit or cabinet A is of the four roller, double display type permitting display of indicia on separate display bands at opposite sides of the cabinet. The cabinet may be constructed of either wood or metal and embodies the parallel end walls 5 suitably connected at their upper ends by the head piece 6 and at a point intermediate their height by the cross piece 7. The lower ends of the end walls 5 are provided with suitable foot pieces 8 to which are secured suitable casters or rollers 9 whereby the unit may be readily moved from place to place and reversed for displaying indicia at either side of the unit. Mounted between the end walls 5 at one side of the cabinet is a display opening frame 10, while mounted at the opposite side of the cabinet is a display opening frame 11 and these open frames provide large, substantially rectangular shaped display openings at opposite sides of the cabinet at points between the horizontal pieces 6 and 7. As will be noted, the upper and lower rails of the frames 10 and 11 are spaced from the pieces 6 and 7, and provide spaces forming upper and lower roller compartments 12 and 13 respectively. Hinged to each edge of the head piece 6 is a suitable door 14, the lower edges of which engage the top rails of the frames 10 and 11 to form closures for the upper roller compartment 12. Suitably hinged to the intermediate cross piece 7 are suitable doors 15, the upper edges of which engage the lower rails of the frames 10 and 11 and form closures for the lower roller compartment 13.

Mounted in each end of each roller compartment 12 and 13 as upon the end walls 5, is a roller support 16 such as shown in detail in Figure 8 and embodying upper and lower strips or bars 17 and 18 respectively separably clamped together by the bolts 19. The lower strips 18 are secured by the spacing blocks 20 to the side walls 5 whereby the roller supports are slightly spaced from the end walls as clearly shown in Figure 7. The meeting edges of the strips 17 and 18 are provided with semi-circular openings which align to provide circular openings 21 which form bearings for the rollers mounted in parallel relation in each of the compartments 12 and 13. The end walls 5 are provided with circular openings 22 which align axially with the openings 21 in the roller supports.

The rollers 23 are all of like construction and interchangeable and each embodies a tubular sleeve portion 24 provided at each end with the end discs 25 providing flanges for retaining the material in proper position upon the sleeve portion. Extended axially through the sleeve portion 24 is a tubular mounting shaft 26 which projects beyond the discs 25 whereby the ends of the shafts may be mounted in the openings 21 in the roller supports 16. These shafts 26 are of a length equal to the distance between the inner or confronting sides of the end walls 5 and project into the narrow spaces formed between the roller supports and the end walls 5 as clearly shown in Figure 7. Secured in each end of the sleeve 24 inwardly of the discs 25 is a block 28, and these blocks are provided at their outer sides with a diametrically extending keyway or slot adapted to receive the ends of a key or pin 27 extended transversely thru the tubular shaft 26. This key 27 serves to connect the sleeve for rotation with the shaft 26.

The band or belt 30 for winding upon the rollers may be of any preferred material such as cloth or a suitable grade of paper and may either be provided at one or both sides with the indicia or subject matter to be displayed. The bands are adapted for detachable connection with the rollers and are provided at each end with a hem 31 for receiving an attaching rod 32 having right angularly offset ends 33 for insertion in suitable openings 34 provided adjacent opposite ends of the sleeve 24. In attaching the bands to the rollers, the ends 31 are inserted in the roller openings 34 and the roller turned once or twice whereby the band holds the ends 33 from being withdrawn. Each end of the band is also provided with suitable tie strings 35 for preventing unrolling of the band during handling of the roller when fully wound.

Figure 12:
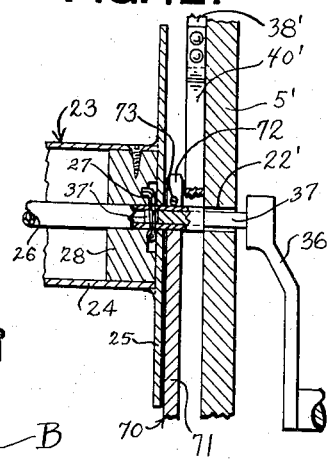

A crank 36 shown more clearly in Figure 12 is provided for rotating any of the rollers 23 and the free end of the shaft portion 37 of the crank is transversely slotted as at 37' whereby when the shaft portion is inserted into an end of one of the roller shafts 26, the pin 27 will be received in the slot 37'. The shaft portion of the crank 36 may be inserted in any one of the openings 22 at either end of the cabinet for imparting rotation to the desired roller for moving the display band either upwardly or downwardly past the display openings. This arrangement permits operation of the unit from either end thereof and allows for the band to be wound upon either the upper or the lower rollers. With the crank 36 in the position shown in Figure 1, the band 30 may be wound upon one of the rollers in the upper roller compartment 12. When winding the band upon one of the rollers in the lower roller compartment 13, the crank is positioned in the desired opening 22 at the ends of the lower roller compartment.

A friction brake means is provided for applying tension to the roller from which the band is being unwound and this device is shiftable for applying tension to either the upper or the lower rollers in accordance with the direction in which the band is being wound. This friction brake means embodies a vertically shiftable brake bar 38 mounted inwardly of one of the end walls 5 and vertically guided upon suitable guide pins 39 working in suitable slots formed longitudinally in the brake bar. Carried by the upper and lower ends of the bar 38 are spring fingers 40 adapted to extend in the space between the roller supports 16 and the end wall and these spring fingers are each formed at their free ends with arcuate-shaped brake shoes 41 adapted to bear upon the ends of the roller shaft 26. The intermediate portion of the bar 38 is provided with a rectangular-shaped opening 42 as shown more clearly in Figure 6, and arranged in said opening 42 is a cam 43 mounted eccentrically upon a rock shaft 44 journaled adjacent its ends in the end walls 5. The projecting ends of the shaft 44 are provided with suitable handles 45 whereby the shaft may be rotated from either end of the cabinet. Rotation of the shaft 44 will cause the cam 43 to move the brake bar 38 vertically so that the brake shoes may either be caused to bear upon the shafts of the upper set of rollers or upon the shafts of the lower set of rollers for retarding rotation of the rollers in accordance with the direction in which the band 30 is being moved. As shown somewhat diagrammatically in Figure 5, the brake shoes 40 are bearing upon the lower roller shafts and out of contact with the upper roller shafts. While not essential, if so desired, one of the friction brake devices may be provided inwardly of each of the end walls 5.

Arranged in slightly spaced relation inwardly of each of the display opening frames 10 and 11 is a flat backing panel or plate 46 over which the bands 30 are movable and these backing panels aside from holding the displayed portion of the bands in a flat condition, permit one to write upon the bands if so desired. The vertical side edges of the panels 46 may be secured in any preferred manner to the end walls 5. The upper and lower edges of the panels are curved inwardly, and the upper and lower rails of the frames 10 and 11 are beveled as shown in Figure 4 for better guiding the bands over the display opening and preventing marring of the indicia on the band.

The sight openings at the opposite sides of the cabinet are provided with display doors permitting either the whole or partial display of the indicia upon the bands 30. Referring particularly to Figure 1, the sectional display door is divided into four sections and embodies the two lower sections 48 hinged to the side rails of the frame 10 as by the hinges 49 whereby the door sections 48 may be independently swung in a horizontal plane. Hinged as at 50 to the upper edge of each lower door section 48, is an upper door section 51. This hinging of the door sections 51 upon the door sections 48 and hinging the door sections 48 upon the frame 10, permits either partial or full display of indicia at the sight opening.

Referring to Figure 2 showing the display door arrangement at the opposite side of the cabinet from that shown in Figure 1, the display door is divided into upper and lower sections 53 and 54 respectively, the lower section being hinged as at 55 to the lower rail of the frame 11 and the upper section 53 being hinged as at 56 to the upper edge of the lower section 54. The lower door section 53 may be provided with a narrow flash door 57 which may be divided into sections independently hinged as at 58 to the door 54. The sections of the flash door 57 may be connected for unitary movement by a suitable catch 59. The hinges 58 may be of the spring type acting to quickly close the flash door when released. If preferred, spring hinges may be provided for any or all of the display door sections at either side of the cabinet.

The display doors are formed of any suitable opaque material such as wood or metal and by so dividing the doors, any desired portion of the indicia on the bands may be displayed. The display doors at each side of the cabinet are provided with a suitable sight opening 60 for displaying numbered sections of indicia upon the bands 30 so that any desired indicia may be properly positioned at the sight opening prior to opening of the desired display door. Each chart, map or sub-division of each band 30 has an identification number delineated thereon for display at the sight openings to permit the operator to readily select the desired subject matter. A card index is provided for each roll, with the sub-divisions of the bands named and numbered thereon to correspond with the numbers on each sub-division. This card index may, if so desired, be arranged in a suitable holder provided upon one of the end walls 5. The bands 30 may either consists of a single continuous strip having indicia upon either one or both surfaces thereof, or consist of suitable maps, charts, etc., suitably joined together to form a continuous strip. Also, the bands may be of plain material to permit writing or printing thereon.

While the cabinet A has been shown provided with a sight opening at each side, it is to be understood that if so desired the cabinet may have a sight opening at merely one side with a single roller provided in the upper and lower roller compartments.

Referring particularly to Figure 3, an arrangement is herein shown whereby new bands or belts may be wound upon the rollers within the lower roller compartment 13. Provided on the outer side of each end wall 5 is a pair of U-bolts 61 providing slides for removably receiving supporting arms 62 having notched ends 63 adapted to receive the ends of a roller shaft 64. The arms 62 are readily removable and may be positioned in the U-bolts 61 for supporting a roller at either side of the cabinet when desiring to place or remove the band from either of the lower rollers in the compartment 13. After the band is wound upon one of the lower rollers in the cabinet, the free end of the band is drawn upwardly over the sight opening and by opening one of the upper doors 14, the band may be attached to the proper roller in the upper roller compartment 12.

Figure 11:
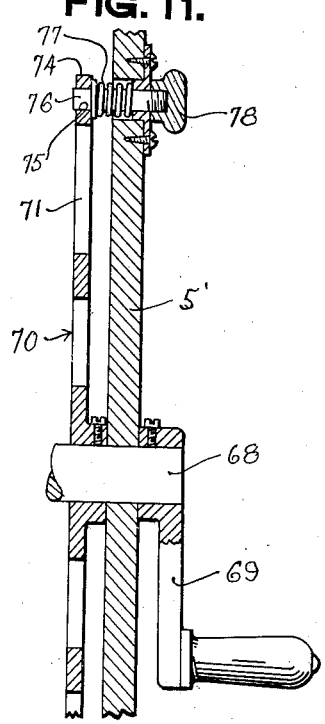
Figures 11 and 12 are enlarged fragmentary sections on the respective lines in Figure 10.

Referring particularly to Figures 10, 11 and 12, an arrangement is shown whereby any preferred number of rollers may be mounted upon a magazine in the cabinet and selectively brought into position for use with the upper two rollers. In Figure 10, the cabinet B is formed at its upper end with an upper roller compartment 12' having hinged doors 14' permitting attachment of the ends of the bands or belts 30 to the rollers 23. The rollers 23 are mounted at their ends in roller supports 16' secured to the end walls 5' of the cabinet B. The cabinet B is also provided with a lower roller compartment 13' having the doors 15' permitting access to the rollers in the lower compartment. Arranged at opposite sides of the cabinet B between the compartments 12' and 13' are the display opening frames 10' and 11' to which are suitably hinged the sectional display doors 65. Arranged inwardly of each display door 65 is a backing panel or plate 46'.

Reciprocally mounted at the inner side of one of the end walls 5' as upon suitable guide pins 39' is a brake bar 38' provided at its upper and lower ends with pairs of spring fingers 40' having arcuate-shaped brake shoes 41' formed at their free ends. The brake bar 38' is vertically shiftable by the cam 43' operating in an opening 42' provided in the brake bar. The cam 43' is mounted upon a rock shaft 44' journaled in the end walls of the cabinet.

The lower roller compartment 13' is adapted to contain a rotary roller holder adapted to support a plurality of the rollers 23. This rotary roller holder or magazine embodies a supporting shaft 68 suitably journaled at its ends in the end walls 5' of the cabinet B and rotatable by means of a crank 69 attached to one end of the shaft. Secured to the shaft 68 just inwardly of each end wall 5' is a spider 70 embodying radially extending spokes or arms 71 having bifurcated outer ends 72 for receiving the ends of the roller shafts 26. The roller shafts 26 are removably retained in the bifurcated ends of the arms 71 by suitable cotter pins 73. The rollers 23 may easily be placed and removed from the spiders 70 by opening the doors 15' and removing the desired cotter pins 73. The tie cords 35 shown in Figure 9 serve to prevent the bands on the rollers from unwinding when the rollers in the compartment 13' are out of position for use.

Connecting the spider arms 71 is a flat ring 74 providing a gauge ring for properly positioning two of the rollers in the compartment 13' for use. This ring 74 is provided with a series of openings 75 spaced equi-distant about the ring and corresponding in number to the number of rollers 23 supported by the spiders 70. Reciprocally extending thru one of the end walls 5' is a positioning pin 76 which is normally spring urged inwardly by a coil spring 77 so that its inner end rides upon the ring 74. The outer end of the pin 76 is provided with a suitable retracting knob 78 whereby the pin may be withdrawn from one of the openings 75 to permit rotation of the roller holder by the crank 69. As the holder is rotated to the desired position, the pin 76 will engage in an opening 75 and retain the holder in a position with the ends of the two uppermost rollers 23 aligning with openings 22' provided in the end walls 5' and adapted to receive the operating crank 36. Thus, any two rollers may be brought into position for use and when in such position may be selectively rotated by the crank 36.

When two of the rollers upon the rotary roller holder are in position for use, the bands thereof may be fed upwardly for attachment to the rollers in the upper compartment 12'. When the rollers are in this position, lowering of the brake bar 38' will apply a braking tension upon the lower rollers. As shown by dotted lines in Figure 10, the brake bar 38' should be in a raised position when the roller holder is rotated so as to bring the lower spring fingers 40' out of the path of movement of the roller shafts 26. As will be observed in Figure 12, the lower spring fingers 40' of the brake bar engage the roller shafts 26 at a point between the spider and an end wall of the cabinet.

Referring to the form of display unit or cabinet C shown in Figures 13 to 18 inclusive, the display unit is of the two roller double display type embodying a double faced display band and embodying an arrangement permitting display of indicia at either side of the cabinet. In this form of display unit, a single roller is mounted in the upper and lower portions of the cabinet and a removable backing panel is provided and adapted for positioning at either side of the display band. The cabinet C is provided at its upper end with an upper roller compartment 80 which may be closed at its upper side by hinged doors 81 permitting placing and removing of the roller 23. The cabinet C is also provided with a lower roller compartment 82 closed by suitable doors 83 which may be hinged to the cross piece 7' forming the bottom of the compartment 82 and connecting the end walls 84 of the cabinet. The lower compartment 82 is intended to house a lower roller 23, and the rollers in the compartments 80 and 82 may have their mounting shafts journaled in suitable mountings provided inwardly of the end walls 84.

Arranged between the compartments 80 and 82 is the display section 86 providing display openings at opposite sides of the cabinet C to be closed by sectional display doors embodying upper and lower sections 87 and 88 respectively. The lower display door sections 88 are hinged at their lower edges to the lower rail of the display opening frame 89, while the upper display door sections are hinged at their lower edges to the upper edges of the sections 88. When the sectional display doors are fully opened as shown in Figure 13, the free edge of the upper section 87 may engage upon a suitable rest whereby the door section 88 in held substantially horizontal for use as a rest for books or papers.

Mounted in the upper end of the display section 88 is a pair of idler rollers 90, while mounted in the lower portion of the display section is a pair of idler rollers 91 and these pairs of rollers 90 and 91 are slightly spaced apart and extend parallel to the band rollers 23 for guiding the display band 30' vertically at the center of the display section 86. The ends of the rollers 90 and 91 are journaled in suitable bearing blocks 92 secured adjacent their ends to the end walls 84 by suitable fastenings 93. Spacing blocks 94 as shown more clearly in Figure 16 space the intermediate portions of the blocks 92 from the end walls 84 and provide guides for a purpose to be later set forth.

Reversably fitting in the display section 86 between the idler rollers 90 and 91 is a backing panel or plate 95 provided transversely of its rear face with supporting strips 96 which extend slightly beyond the side edges of the panel as clearly shown in Figure 15. The backing panel 95 is removably supported in the display section upon cross rests 97 secured at their ends to the end walls 84 and held spaced at their intermediate portions from the end walls by suitable spacer blocks 98 as shown more clearly in Figure 17. These cross rests 97 have their upper edges notched out as at 99 and these notches receive the projecting ends of the supporting strips 96. By observing Figure 13, it will be seen that the backing panel 95 may be removed by slightly raising the panel until the supporting strips 96 are moved out of the notches 99 and then the panel moved laterally thru one of the display openings. The upper and lower edges of the backing panel 95 are rounded toward the rear of the panel.

By observing Figures 13 and 14 showing the backing panel in reverse positions it will be seen that the idler rollers 90 and 91 guide the belt 30' over the flat front face of the panel.

Reciprocally mounted for vertical guided movement at the inner side of one of the end walls 84 is a brake bar 100 provided at its upper and lower end with spring members 101 having arcuately concaved portions 102 for bearing engagement with the ends of the roller mounting shafts of the rollers 23. This brake bar 100 is rectangular shape in cross section and is slidably guided in the guide ways formed by the bearing blocks 92 and supporting strips 97 as clearly shown in Figures 16 and 17. If so desired, however, the brake bar 100 may be guided by a pin and slot arrangement as in Figure 5. The brake bar 100 may be vertically shifted by the cam 103 operating in an opening 104 provided in the brake bar. In Figure 13, the brake bar is in a lowered position applying a braking action to the roller in the lower compartment 82.

The display band 30' has display indicia provided upon each face thereof and when desiring to display indicia at either face of the band it is merely necessary to remove the backing panel 95 and dispose the backing panel against the opposite face of the band. The backing panel will hold the displayed portion of the display band in a flat condition and permit writing or marking upon the band, however, when desired the backing panel may be removed so as to display the indicia at both faces of the band.

Referring now to the form of cabinet D shown in Figure 19, like reference numerals have been applied to structural parts corresponding to those shown in Figures 13 to 18 inclusive. In the form of cabinet D, an arrangement is shown whereby a number of rollers provided with double faced bands may be mounted upon a magazine in the lower roller compartment 105 and selectively brought into position for use. The roller compartment 105 is provided with the hinged doors 106 permitting access to the rollers in the lower compartment.

Rotatably mounted in the lower roller compartment 105 as upon a supporting shaft 107, is a roller holder which in the example shown is adapted to support three of the rollers 23. Mounted upon the ends of the shaft 107 are suitable spiders embodying radially extending spokes or arms 108 having bifurcated outer ends for removably receiving the ends of the roller shafts 26. The roller shafts may be retained in the outer ends of the arms 108 by suitable pins 109. Connecting the arms 108 is a flat ring 110 in which is provided openings 111 spaced equi-distant apart about the ring and corresponding in number to the number of rollers 23. A positioning pin 112 operating as shown in Figure 11, engages in the openings 111 for retaining one of the rollers 23 in operative relation below the display section. The shaft 107 may be rotated by a crank similar to that shown in Figure 11 for bringing one of the rollers into position for use. Thus, with the form of cabinet D, a number of rollers having bands in which the display indicia is provided at each place of the band, may be selectively brought into operative relation to the single roller in the upper roller compartment.

Thus it will be seen that a display cabinet has been provided wherein various phases of subject matter may be combined in a single display unit which may be readily moved from place to place so as to be disposed directly in front of the observers. It will also be apparent that a novel arrangement of display has been provided wherein either partial or full display of indicia at the display opening may be had thru the provision of sectional display doors which may be operated to display any desired indicia. Other features of the invention reside in the capacity of the rollers; interchangeability of any or all rollers; detachability of the bands from the rollers permitting interchanging of the bands; manner of attaching the bands to the rollers; the arrangement whereby a display band having display indicia at both sides thereof may be selectively displayed at either side of the cabinet, and the shiftable tensioning means for selectively applying a braking action to the rollers to prevent too free unwinding of the material.

Changes in detail may be made to the forms of invention herein shown and described, without departing from the spirit of the invention or the scope of the following claims.

I claim:

1. In a display unit, a cabinet having a display opening, a display band movable past the display opening, and a display door closing the display opening and embodying independently movable sections for partial display of the band at the display opening.

2. In a display unit, a cabinet having a display opening, rollers mounted in the cabinet, a display band wound on the rollers for travel past the display opening, means for imparting travel to the band, and an opaque door closing the display opening and embodying independently movable sections.

3. In a display unit, a cabinet having a display opening, and a display door for the display opening embodying sections hinged to the cabinet and sections hinged to the first mentioned sections whereby display indicia may be exposed at various portions of the display opening.

4. In a display unit, a cabinet having a display opening, a display band in the cabinet for movement past the display opening, a door for closing the display opening, and a spring closed flash door provided in the door for exposing selected portions of the display band at the display opening.

5. In a display unit, a cabinet provided with oppositely disposed display openings, rollers mounted in the cabinet, a band wound at its ends upon the rollers for travel past the display openings, means for selectively imparting rotation to either of the rollers, and a display door closing each display opening and each embodying independently movable sections.

6. In a display unit, a cabinet having display openings provided in opposite sides thereof, caster wheels supporting the cabinet, a display band having travel between the display openings, means for selectively imparting travel to the band in either direction, and a sectional display door closing each of the display openings.

7. In a display unit, a cabinet having a display opening, a pair of rollers journaled in the cabinet, a band having its ends wound about the rollers and movable past the display opening, means for imparting rotation to either of the rollers for winding the band thereon, and shiftable tensioning means for selectively retarding rotation of either roller and embodying yieldable brake members alternately engageable with the rollers.

8. In a display unit, a cabinet having a display opening, a pair of rollers journaled one above and the other below the display opening within the cabinet, a band having its ends wound about the rollers and movable past the display opening, a vertically shiftable brake bar, a spring member carried by each end of the brake bar and alternately engageable with the rollers upon shifting of the brake bar, and cam means for shifting the brake bar.

9. In a display unit, a cabinet having a display opening, a pair of rollers journaled in the cabinet and each embodying a mounting shaft, a band having its ends wound about the rollers and movable past the display openings, means for imparting rotation to either of the rollers, a brake bar having an opening and longitudinally movable in the cabinet, a spring finger mounted at each end of the brake bar and alternately engageable with the mounting shaft of the rollers upon movement of the brake bar, a rock shaft, and an eccentric mounted on the rock shaft and arranged in the opening of the brake bar for imparting longitudinal movement thereto for selectively applying a braking action upon the rollers.

10. In a display unit, a cabinet having display openings provided at opposite sides thereof, pairs of rollers journaled in the cabinet, a band wound about the rollers of each pair and movable one past each of the display openings, means for imparting rotation to either of the rollers for winding the band thereon, a brake bar shiftably mounted in the cabinet, spring fingers carried by each end of the brake bar for engagement one with each of said rollers, and means for shifting the brake bar whereby the spring fingers will selectively apply a braking action upon the rollers at opposite ends of the brake bar.

11. In a display unit, a cabinet having a display opening and roller compartments provided one above the other below the display opening, a roller journaled in each of said compartments, a display band having its ends wound about the rollers and movable past the display opening, means for rotating either of the rollers for winding the band thereon, shiftable tensioning means for selectively retarding rotation of the rollers, a closure for each of the roller compartments, and a sectional display door for the display opening.

12. In a display unit, a cabinet having a display section and roller compartments provided one above and the other below the display section, said display section having display openings at opposite sides thereof, a pair of rollers journaled in each of the compartments, display bands having their ends wound about companion pairs of the rollers and movable thru the display sections for display one at each of the display openings, means for rotating any one of the rollers in either compartment to wind the band thereon, tensioning means for selectively retarding rotation of the rollers in either compartment, and operating means for the tensioning means.

13. In a display unit, a cabinet having a shallow display section having display openings in opposite sides thereof and a roller compartment above and below the display section, rollers journaled in each of the compartments, display bands having their ends wound about companion pairs of the rollers and movable thru the display section for display one at each of the display openings, a backing panel for each display opening, hinged closures for each compartment permitting access to the rollers, means for imparting rotation to any selected one of the rollers to wind the band thereon, tensioning means for selectively retarding rotation of the rollers in either compartment, actuating means for the tensioning means, and a sectional display door for each of the display openings.

14. In a display unit, a cabinet having a display section provided with display openings in opposite sides thereof and roller compartments provided above and below the display section, roller mountings in each roller compartment, rollers in each compartment each embodying a mounting shaft journaled at their ends in the roller mountings, said cabinet having crank receiving openings aligning with each end of the roller mounting shafts, a removable crank insertable into any of the crank receiving openings and engageable with the ends of the roller shaft for imparting rotation thereto, bands having their ends wound about companion pairs of the rollers and movable thru the display section for display one at each of the display openings, tensioning means for selectively retarding rotation of the rollers in either compartment, and actuating means for the tensioning means.

15. In a display unit, a cabinet having display openings and roller compartments provided above and below the display openings, rollers journaled in each of the compartments and interchangeable one with another, hinged closures for each of the compartments, bands having their ends wound about companion pairs of the rollers and movable one past each of the display openings, connecting means at each end of each band for detachably connecting the bands to the rollers, means for rotating the rollers, and means for retarding rotation of the rollers.

16. In a display unit, a cabinet having a display opening and roller compartments provided above and below the display opening, a roller journaled in each of said compartments, a display band having its ends detachably connected to and wound about the rollers for movement past the display opening, means for rotating either of the rollers for winding the band thereon, roller tensioning means for selectively retarding rotation of the rollers, a hinged closure for the lower compartment and extending thruout the length of the roller, and means for supporting a roller exteriorly of the cabinet to permit interchanging of the display band by winding or unwinding the band from the roller in the lower compartment.

17. In a display unit, a roller embodying a sleeve portion and end discs at each end of the sleeve portion, said sleeve portion adjacent the end disc being provided with radially opening sockets, and a display belt wound upon the roller between the end discs and having an attaching rod secured across each end thereof and provided with right angularly extending end portions for insertion in the sockets at opposite ends of said sleeve portion.

18. In a display unit, a cabinet having upper and lower roller compartments, a roller carrier rotatably journaled in the lower compartment, a series of rollers rotatably mounted on the carrier and each having a display band wound thereon, means for rotating the carrier for selectively bringing the rollers into position for use, a roller journaled in the upper compartment and to which the bands are adapted to be detachably connected for displaying the bands, means for rotating the upper roller, means for rotating the carrier supported rollers when in position for use, and shiftable tensioning means for selectively applying a tension to the rollers of the band being displayed.

19. In a display unit, a cabinet having upper and lower roller compartments, a roller carrier rotatably journaled in the lower compartment, a series of rollers rotatably mounted on the carrier and each having a display band wound thereon, means for rotating the carrier for selectively bringing the rollers into position for use, releasable positioning means for the carrier, a roller journaled in the upper compartment and to which the bands are adapted to be detachably connected for display of the bands, means for rotating the upper roller, and the carrier supported rollers when in position for use, closures for the upper and lower compartments, a shiftable brake bar, and yieldable fingers carried by the ends of the bar to alternately engage the rollers of the band being displayed for retarding rotation of the roller from which the band is being unwound.

20. In a display unit, a cabinet having an upper compartment and a lower compartment, said cabinet having display openings provided in opposite sides thereof between the compartments, a roller carrier rotatably journaled in the lower compartment, a series of rollers rotatably and removably mounted on the carrier and each adapted to have a display band wound thereon, means for rotating the carrier for selectively bringing two of the rollers into position for use, a pair of rollers journaled in the upper compartment and to which the bands are adapted to be detachably connected for display at the display openings, means for independently rotating the upper rollers, means for independently rotating the carrier supported rollers when in position for use, and shiftable tensioning means for selectively applying a tension upon the upper rollers or upon the lower rollers when in position for use.

21. In a display unit, a cabinet embodying end walls, a roller carrier rotatably journaled in the end walls and embodying a gauge ring having an annular series of openings, a series of rollers detachably and rotatably mounted on the carrier, means for rotating the carrier for selectively bringing the rollers into position for use, means for manually rotating the rollers when in a position for use, a retractable positioning pin movable through an end wall of the cabinet and engageable in the openings of the gauge ring of the carrier for positioning thereof, and tensioning means movable into engagement with the rollers when in a position for use.

22. In a display unit, a cabinet having a display section having display openings at opposite sides thereof, a roller journaled in each of said compartments, a double faced display band having its ends wound about the rollers and movable thru the display section between the display openings, means for rotating either of the rollers for winding the band thereon, a shiftable tensioning member for selectively applying a braking action upon the rollers, and means for actuating the tensioning member.

23. In a display unit, a cabinet having a display section having display openings at opposite sides thereof, a roller journaled in each said compartments, a double faced display band having its ends wound about the rollers and movable thru the display section between the display openings, a backing panel in the display section and removable for positioning at either face of the display band, and means for selectively rotating the rollers.

24. In a display unit, a cabinet having a display section having display openings at opposite sides thereof, a roller journaled in each of said compartments, a double faced display band having its ends wound about the rollers and movable thru the display section between the display openings, a backing panel in the display section and removable for positioning at either face of the display band, means for selectively rotating the rollers, and a sectional display door for each display opening.

25. In a display unit, a cabinet having a display section having display openings at opposite sides thereof, a roller journaled in each of said compartments, a double faced display band having its ends wound about the rollers and movable thru the display section between the display openings, idler guide rollers for directing the band centrally thru the display section, a backing panel removably supported in the display section for disposition at either face of the band, means for selectively applying tension to the band carrying rollers, and means for imparting travel of the band in either direction.

26. In a display unit embodying a display section having display openings at opposite sides thereof, a double faced display band for travel thru the display section, and a backing panel removably mounted in the display section for positioning at either face of the display band.

WILL HULLINGER.